United States Patent [19]
Brown

[11] Patent Number: 4,800,764
[45] Date of Patent: Jan. 31, 1989

[54] APPARATUS FOR SENSING RELATIVE ROTATION BETWEEN MEMBERS

[75] Inventor: Louis R. Brown, Livonia, Mich.

[73] Assignee: TRW Inc., Lyndhurst, Ohio

[21] Appl. No.: 58,243

[22] Filed: Jun. 4, 1987

[51] Int. Cl.[4] .............................................. G01L 3/10
[52] U.S. Cl. ................................. 73/862.33; 73/862.32
[58] Field of Search .............. 73/862.32, 862.33, 432.1

[56] References Cited

U.S. PATENT DOCUMENTS

| | | | |
|---|---|---|---|
| 891,018 | 6/1908 | Vawter, Jr. | |
| 2,498,282 | 2/1950 | Langer | 73/862.33 |
| 3,084,540 | 4/1963 | Larkin | 73/862.32 |
| 3,104,544 | 9/1963 | Guiot | 73/862.33 |
| 3,580,352 | 5/1971 | Hestad et al. | 73/862.33 X |
| 4,193,720 | 3/1980 | Machida | 73/862.33 X |
| 4,437,531 | 3/1984 | Urabe | |
| 4,629,952 | 12/1986 | Shimizu | |
| 4,635,741 | 1/1987 | Morishita et al. | 73/862.33 X |

FOREIGN PATENT DOCUMENTS 476468 11/1975 U.S.S.R. .

Primary Examiner—Tom Noland
Attorney, Agent, or Firm—Tarolli, Sundheim & Covell

[57] ABSTRACT

An apparatus for sensing the amount and direction of relative rotational movement between an input member and an output member about a common central axis. The apparatus includes a ring link. The ring link is mounted for pivotal movement relative to the input and output members about a first axis extending transverse to the central axis. The ring link is pivoted in response to relative rotation of the input and output members. A transformer element is mounted for movement along the central axis and movable along the central axis upon pivotal movement of the ring link. The position of the transformer element is sensed and an electrical output signal is generated indicative of the amount and direction of movement of the transformer element.

28 Claims, 5 Drawing Sheets

APPARATUS FOR SENSING RELATIVE ROTATION BETWEEN MEMBERS

BACKGROUND OF THE INVENTION

1. Field of the Invention

The present invention relates to sensing the amount and direction of relative rotation between an input member and an output member, and in particular, relates to a torque sensor for use in an electric power assist vehicle steering system.

2. Description of the Prior Art

Electric power assist vehicle steering systems are known. Such systems include an electric motor which is energized to provide power assist in response to turning the steering wheel of the vehicle. An input member is connected to the steering wheel of the vehicle and an output member is connected with the steerable wheels of the vehicle. A torsion bar is connected between the input and output members. A torque sensor senses the amount and direction of relative rotation between the members and outputs an electrical signal to the electric motor. The electrical signal is indicative of the amount and direction of the relative rotation between the members.

SUMMARY OF THE INVENTION

The present invention is an apparatus for sensing the amount and direction of relative rotation between an input member and an output member located coaxially along a common central axis. Relative rotation between the input and output members results from torque being applied to the members. Thus, the apparatus of the present invention functions as a torque sensor. The input member may be connected to a vehicle steering wheel. The output member may be connected with the steerable wheels of the vehicle.

The apparatus of the present invention includes a link associated with the input and output members. The link has an initial position when the members are in a predetermined relative position. The link is mounted for pivotal movement relative to the input and output members from the initial position in response to relative rotation of the input and output members. The link pivots about an axis which extends transverse to the central axis. The amount and direction of the pivotal movement of the link is proportional to the amount and direction of relative rotation between the input and output members.

The present invention includes means responsive to pivotal movement of the link for generating an electrical signal indicative of the amount and direction of pivotal movement of the link. In a preferred embodiment of the present invention, the means responsive to pivotal movement of the link includes a transformer element mounted axially adjacent the link for movement along the central axis. The transformer element is moved from an initial position along the central axis in response to pivotal movement of the link and thus moves in proportion to the relative rotation of the input and output members about the central axis. Movement of the transformer element is sensed and an electrical signal is generated indicative of the amount and direction of movement of the transformer element from the initial position. This electrical signal is communicated to a processor that controls an electric power assist steering motor to actuate the motor.

Thus, the present invention converts relative rotation between the input and output members into pivotal movement of the link. An output signal is generated in response to the pivotal movement of the link. The output signal is indicative of the amount and direction of the relative rotation of the input and output members.

BRIEF DESCRIPTION OF THE DRAWINGS

Further features and advantages of the present invention will become apparent to those skilled in the art to which the present invention relates from reading the following specification with reference to the accompanying drawings, in which.

DETAILED DESCRIPTION OF THE INVENTION

Figure 1:
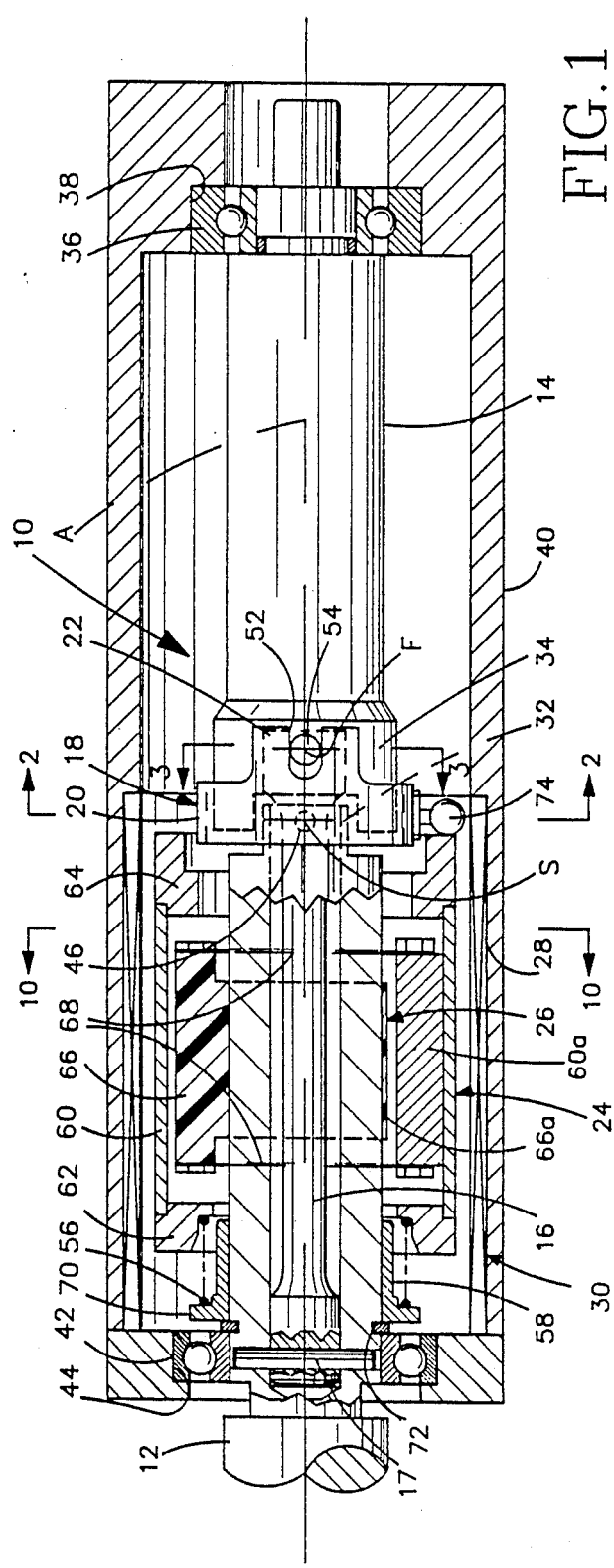
FIG. 1 is a side view, partially in section, of an apparatus embodying the present invention.
Figure 2:
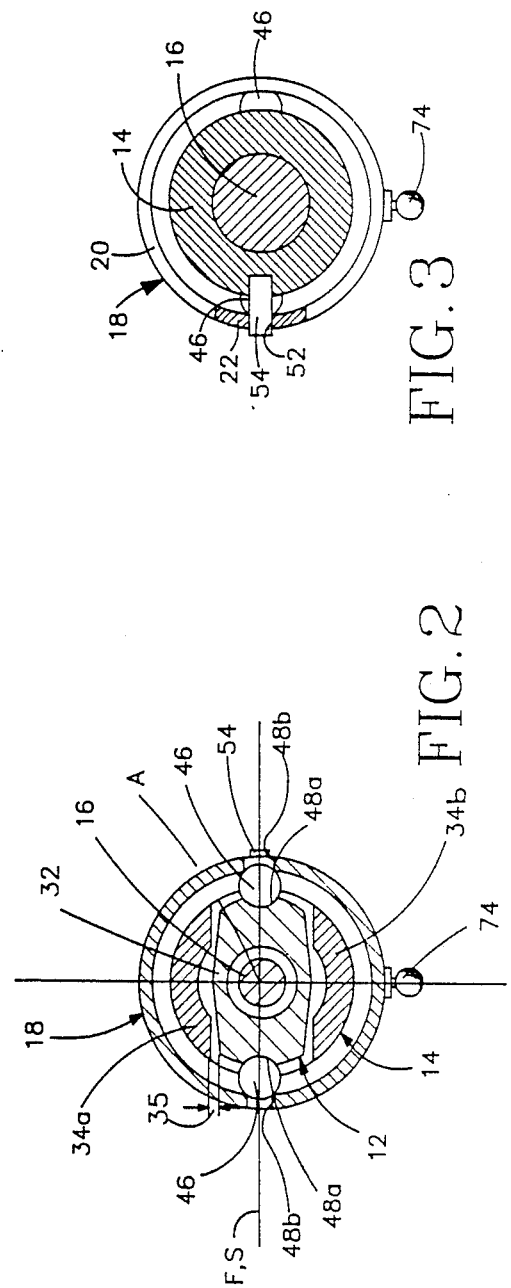
FIG. 2 is a sectional view of the apparatus of FIG. 1, taken approximately along the line 2—2 of FIG. 1.

An apparatus 10 embodying the present invention is illustrated in FIGS. 1 and 2. The apparatus 10 senses the amount and direction of relative rotation between an input member 12 and an output member 14 located coaxially along a common central axis A. The input member 12 is an input shaft which is connectable with a vehicle steering wheel. The output member 14 is a drive gear of the vehicle steering system. The drive gear is connectable with the steerable wheels of the vehicle. The apparatus 10 controls an electric motor (not shown) which moves the steerable wheels when actuated.

Figure 3:
FIG. 3 is a sectional view of the apparatus of FIG. 1, taken approximately along the line 3—3 of FIG. 1.

The apparatus 10 includes an elongated torsion bar 16. The torsion bar 16 has a first axial end portion, to the left as viewed in FIG. 1, connected to the input member 12 in a known manner, such as by a pin 17. The torsion bar 16 has a second axial end portion, to the right as viewed in FIG. 1, connected to the output member 14, in a known manner, such as by an interference fit (see FIG. 3). The torsion bar 16 biases the input and output members 12, 14 to a neutral or centered position, as illustrated in FIGS. 1 and 2, upon relative rotation of the members from the neutral position.

The input member 12 and the output member 14 have respective end portions 32, 34 disposed adjacent one another. The end portions 32, 34 engage after a predetermined amount of relative rotation between the input and output members 12, 14. The end portion 34 is bifurcated, having a pair of diametrically opposed legs 34a, 34b (FIG. 2) extending axially from the output member 14. The end portion 32 extends axially from the input member 12 so that a clearance 35 exists between the end portion 32 and the bifurcated end portion 34 of the output member 14. The clearance 35 between the end portions 32, 34 permits the predetermined amount of relative rotation between the members 12, 14, preferably 4 degrees in either direction about the axis A from the neutral position shown in FIG. 2. When the clearance 35 is taken up due to twisting of the torsion bar 16, as viewed in FIGS. 5 and 7, the end portion 32 engages and mechanically rotates bifurcated end portion 34 of the output member 14 about the axis A.

The output member 14 is rotatably supported in a housing 40 by a bearing 36. The housing 40 may be a steering gear housing mounted to the vehicle in a known manner. Another bearing 42 rotatably supports the input member 12 in the housing 40. Thus, the input member 12, output member 14 and torsion bar 16 are supported by the bearings 36, 42 for rotation in either direction about the axis A.

An annular ring link 18 is located adjacent the end portions 32, 34 of the input member 12 and output member 14. The ring link 18 has a ring portion 20 which encircles the ends 32, 34 of the input member 12 and output member 14. The ring link 18 is preferably made from a portion of a metal tube. The ring link 18 also has a portion 22 which projects from the ring portion 20 and extends parallel to the central axis A when the input member 12 and output member are in the neutral position. The portion 22 of the ring link 18 is bifurcated and has a surface which defines a slot 52. The slot 52 also extends parallel to the central axis A when the input member 12 and the output member 14 are in the neutral position.

The ring link 18 is supported by a pin 54 for pivotal movement about an axis F. Tho axis F extends transverse to the central axis A. The pin 54 is fixed to the output member 14 in a known manner, such as by adhesive bonding or by an interference fit. The pin 54 projects into the slot 52. The diameter of the pin 54 corresponds to the width of the slot 52.

The ring link 18 is also supported by a pair of spherical elements 46 for pivotal movement about an axis S. The axis S is spaced from the axis F along the central axis A. The spherical elements 46 are received in seats 48a located on diametrically opposite sides of the end portion 32 of the input member 12. The seats 48a in the end portion 32 are defined by hemispherical surfaces in the end portion. The spherical elements 46 are also received in seats 48b located diametrically opposite one another in the ring portion 20 of ring link 18. The seats 48b in the ring link 18 are defined by holes extending through the ring portion 20.

The ring link 18 pivots in response to relative rotation between the input member 12 and the output member 14. When the input member 12 rotates relative to the output member 14, the spherical elements 46 apply a force to the ring link 18 to effect pivotal movement of the ring link 18 about the axis F. When the output member 14 rotates relative to the input member 12, the pin 54 applies a force to the ring link 18 to effect pivotal movement of the ring link 18 about the axis S.

Figure 6:
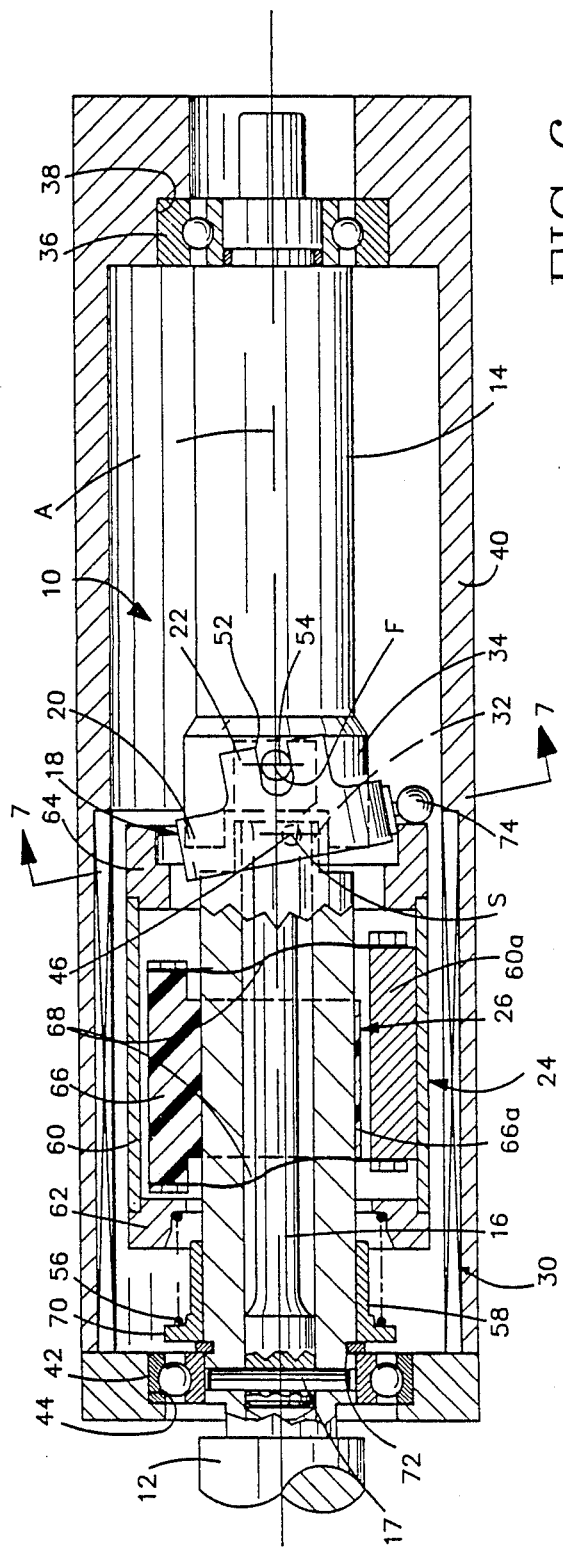
FIG. 6 is a side elevational view similar to FIG. 1, illustrating some of the parts in yet another position.

A transformer element 24 encircles the input member 12. The transformer element 24 is axially adjacent to the left end of the ring link 18, as viewed in FIGS. 1, 4 and 6. The transformer element 24 includes a core portion 60 and a pair of opposite annular end caps 62, 64. The outer diameter of the ring link 18 is sufficiently less than the inner diameter of the annular end cap 64 to prevent engagement between the ring link and the annular end cap 64. The core portion 60 of the transformer element 24 is made of a ferromagnetic material The core portion 60 of the transformer element 24 has a cylindrical outer surface. A mounting block 60a is attached to an inner surface of the core portion 60, such as by adhesive bonding.

Figure 10:
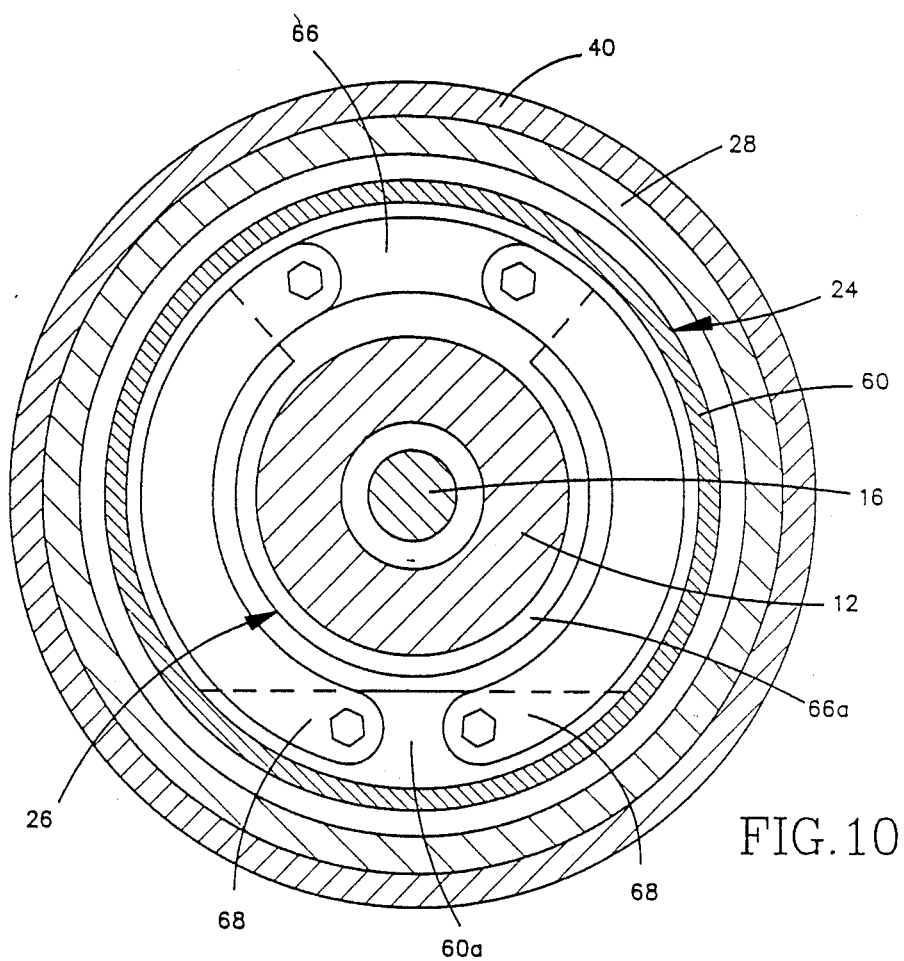
FIG. 10 is a sectional view of the apparatus of FIG. 1, taken approximately along the line 10—10 of FIG. 1.

The transformer element 24 (FIG. 10) is attached by a mounting 26 to the input member 12 and rotates with the input member 12. The mounting 26 includes a non-ferrous block 66 which is suitably attached to the input member 12, such as by a clamp portion 66a which encircles the input member 12 and is clamped thereto. The mounting 26 also includes four flexures 68 (spring fingers) which resiliently interconnect the block 66 and the mounting block 60a attached to the core portion 60. A pair of flexures 68 are connected to each end of the block 66 and the mounting block 60a by fasteners. Each of the flexures 68 is arcuate and preferably made of a thin metal. The flexures 68 permit the transformer element 24 to be easily moved along the axis A relative to the inner portion 66 of the mounting 26 and the input member 12. While the flexures 68 are preferably used, it should be apparent that other ways of supporting the core portion 60 for movement along the axis A may be used.

A coiled compression spring 56 biases the transformer element 24 to the right in FIG. 1 along the axis A and toward the ring link 18. The spring 56 biases the end cap 64 into abutting engagement with a spherical dog 74 on the ring link 18. The spherical dog 74 is fixed to and projects radially outwardly from the ring link 18. An annular sleeve 58 confines the spring 56 between a rim portion 70 of the annular sleeve and the end cap 62 of the transformer element 24. The annular sleeve 58 is retained on the input member 12 by a known split ring 72 inserted into an annular recess in the input member 12. The biasing force of the spring 56 is relatively small so it does not inhibit pivotal movement of the ring link 18 but is sufficient to maintain the transformer element 24 abutting the spherical dog 74. Thus, the spherical dog 74 and biasing spring 56 control the position of the core portion 60 of the transformer element 24 along the axis A during pivotal movement of the ring link 18.

The core portion 60 of the transformer element 24 moves along the axis A in proportion to the amount and direction of pivotal movement of the ring link 18. The pivotal movement of the ring link 18 is also proportional to the amount and direction of relative rotation of the input member 12 and output member 14. Thus, the movement of the core portion 60 along the axis A is proportional to the amount and direction of relative rotation between the input member 12 and output member 14.

Figure 8:
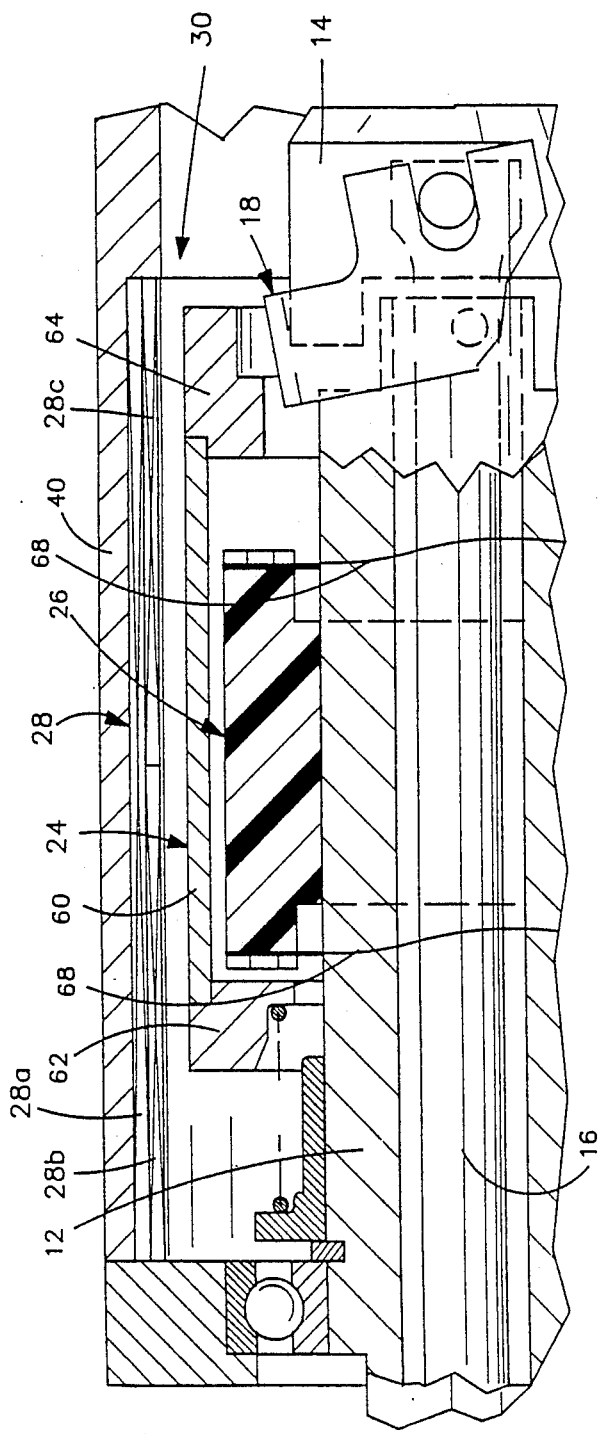
FIG. 8 is an enlarged view of a portion of the apparatus of FIG. 6.

A position sensor 28 is fixed to the housing 40 adjacent to and radially outwardly of the cylindrical core portion 60 of the transformer element 24. The position sensor 28 detects displacement of the core portion 60 of the transformer element 24 in either direction along the axis A and generates an electrical output signal indicative of the magnitude and direction of its displacement from the central, neutral position. Preferably, the position sensor 28 is the stationary portion of a linear voltage differential transformer (LVDT) 30. The position sensor 28 includes a primary or excitation coil 28a (FIG. 8) and secondary or sensing coils 28b, 28li c. The outer diameter of the transformer element 24 is chosen to provide a relatively small clearance at the inner diameter near the position sensor 28.

In the preferred embodiment, the transformer element 24 and position sensor 28 operate as a linear voltage differential transformer (LVDT) 30. It will be apparent, however, that other suitable position sensing devices, such as contact switches or Hall effect sensors, can be used to detect the position of the core portion 60 and all such position sensing devices are within the scope of the present invention.

Figure 9:
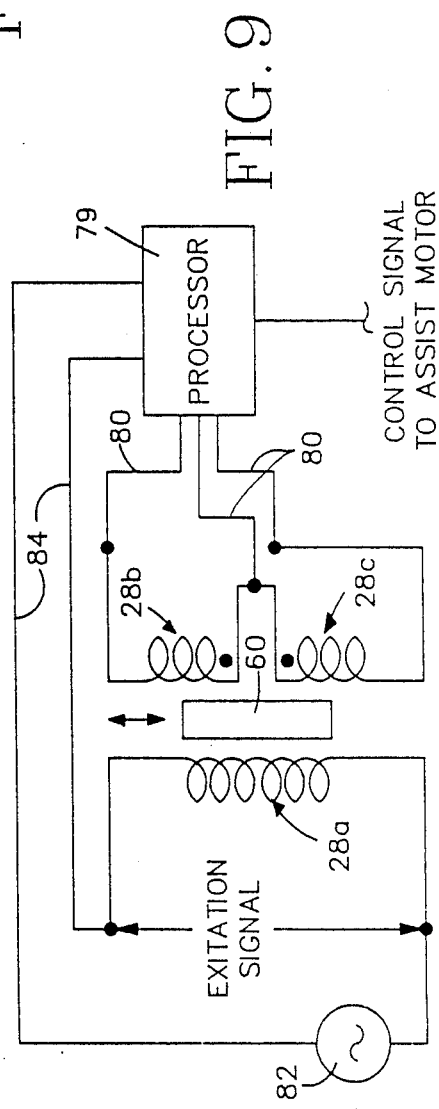
FIG. 9 is a schematic illustration of an electrical circuit associated with the apparatus of the present invention.

A waveform generator 82 (FIG. 9) is connected across the excitation coil 28a and with a conventional processor 79 by wires 84. The generator 82 applies an AC signal across the primary coil 28a, thus inducing signals in secondary coils 28b and 28c. When the core portion 60 of the transformer element 24 is in the initial position axially centered within the position sensor 28, the signal induced in coil 28b balances and cancels the signal induced in coil 28c. When the core portion 60 moves to a non-centered position, however, the signal induced in the secondary coils 28b, 28c will no longer balance. The phase of the resulting output signal (relative to the excitation signal) will depend upon which secondary coil 28b or 28c the core portion 60 is closer to, and the magnitude of the output signal will depend upon the magnitude of the displacement of the core portion from the non-centered position. The output signal produced by the position sensor 28 is thus indicative of the amount and direction of relative rotation between the input member 12 and the output member 14 which is proportional to the torque applied to one of the members.

The electrical output of the secondary coils 28b, 28c is conducted by wires 80 to the processor 79. The processor 79 compares the variation between the excitation and output signals to determine magnitude and direction of applied torque and generates an electrical control signal which is conducted to an electrical power assist motor (not shown) for controlling the power assist.

From the above, the operation of the present invention should be apparent. However, the operation will be described below. When the input member 12 is rotated counterclockwise about the axis A from the neutral position illustrated in FIG. 2 to the position of FIG. 5, the input member rotates through an angular displacement "d" relative to the output member 14. Such rotation of the input member 12 relative to the output member 14 may be effected by the vehicle operator turning the steering wheel for a lefthand turn when the vehicle is moving forward. In response to the input member 12 rotating counterclockwise relative to the output member 14, the ring link 18 is pivoted clockwise, as viewed in FIG. 4, by the spherical elements 46 about the axis F in proportion to the relative rotation between the members. The clockwise pivotal movement of the ring link 18 about the axis F causes the dog 74 to force the transformer element 24 to move along the axis A from the centered or initial position of FIG. 1 to the left-of-center position of FIG. 4 against the bias of the compression spring 56 and flexures 68. Displacement of the transformer element 24 along the axis A is detected by the position sensor 28 in the manner described previously.

Figure 7:
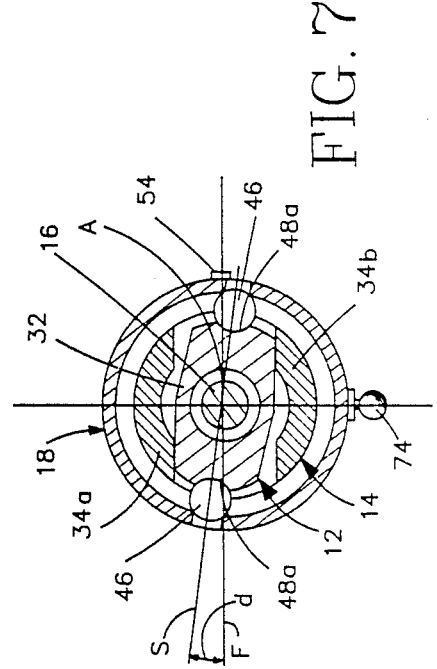
FIG. 7 is a sectional view of the apparatus of FIG. 1 taken approximately along line 7—7 of FIG. 6.

When the input member 12 is rotated clockwise about the axis A from the neutral position illustrated in FIG. 2 to the position of FIG. 7, the input member moves through a displacement "d" relative to the output member 14. Such rotation of the input member 12 relative to the output member 14 may be effected by the vehicle operator turning the steering wheel for a righthand turn as the vehicle moves in a forward direction. In response to the input member 12 rotating clockwise relative to the output member 14, the ring link 18 is pivoted counterclockwise, as viewed in FIG. 6, by the spherical elements 46 about the axis F in proportion to the relative rotation between the members. The counterclockwise pivotal movement of the ring link 18 permits the transformer element 24 to move along the axis A from its centered position in FIG. 1 to the position shown in FIG. 6 under the bias force of the compression spring 56. The displacement of the transformer element 24 along the axis A is detected by the position sensor 28 and an electrical signal indicative of the amount and direction of the displacement is generated. The electrical signal is then conducted to the processor 79.

As torque causing relative rotation between the input and output members 12, 14 is relieved, the ring link 18 pivots to permit the core portion 60 to return to the centered or neutral position of FIG. 1. Thus, when the torque is relieved, no power is applied to the assist motor. For example, when the output member 14 rotates clockwise about the axis A relative to the input member 12 from the position of FIG. 7 to the neutral position of FIG. 2, the ring link 18 is pivoted by the drive pin 54 about the axis S in a clockwise direction, as viewed in FIG. 6. This clockwise pivotal movement of the ring link 18 forces the transformer element 24 to move along the axis A from the position shown in FIG. 6 to the centered or initial position of FIG. 1.

Figure 4:
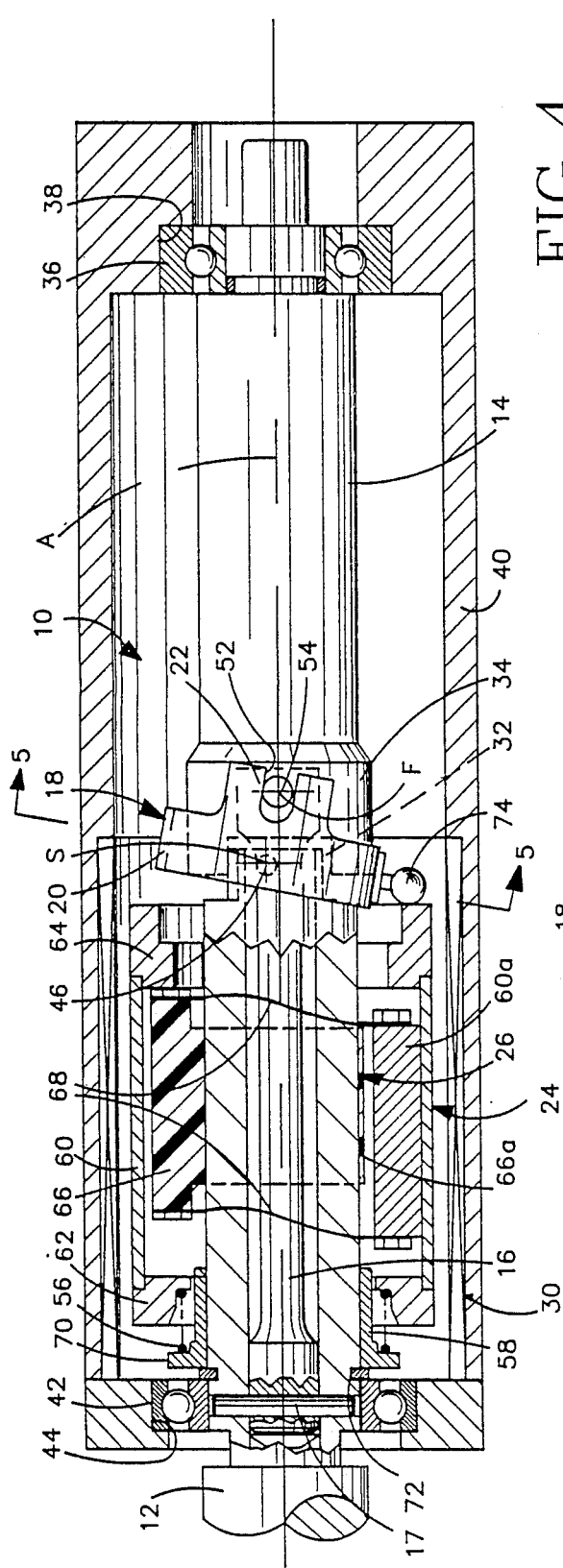
FIG. 4 is a view similar to FIG. 1, illustrating some of the parts in another position.
Figure 5:
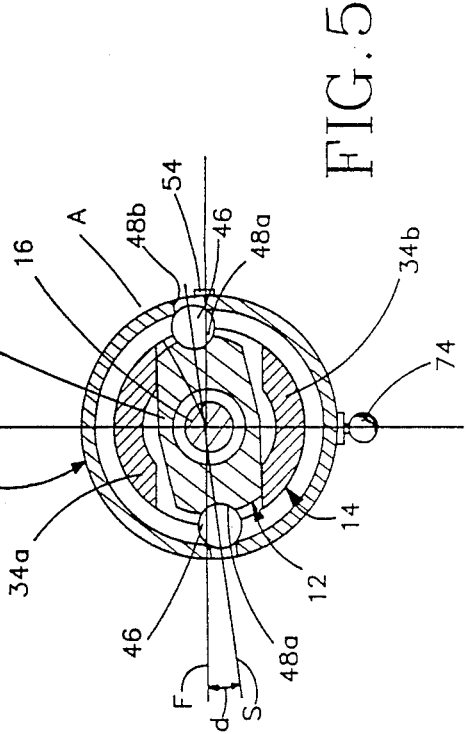
FIG. 5 is a sectional view of the apparatus, taken approximately along line 5—5 of FIG. 4.

When the output member 14 rotates counterclockwise about the axis A, relative to the input member 12 from the position illustrated in FIG. 5 to the neutral position of FIG. 2, the ring link 18 is pivoted by the drive pin 54 about the axis S in the counterclockwise direction, shown in FIG. 4. This counterclockwise pivotal movement of the ring link 18 permits the transformer element 24 to move along the axis A from the position of FIG. 4 to the centered position of FIG. 1.

From the above description of a preferred embodiment of the invention, those skilled in the art will perceive improvements, changes and modifications. Such improvements, changes and modifications within the skill of the art are intended to be covered by the appended claims.

Having described a preferred embodiment, I claim:

1. An apparatus for sensing the amount and direction of relative rotation between an input member and an output member which are disposed coaxially along a common central axis, said apparatus comprising:
   a sole link member associated with the input and output members;
   means supporting said sole link member for pivotal movement relative to the input and output members about a first axis extending transverse to the central axis in response to relative rotation between the input and output members;
   means for effecting pivotal movement of said sole link member about said first axis in response to relative rotation of the input and output members; and
   means responsive to pivotal movement of said sole link member for generating an output signal indicative of the amount and direction of pivotal movement of said sole link member.

2. An apparatus as set forth in claim 1 wherein said sole link member includes a portion which encircles the outer periphery of at least one of said input and output members.

3. An apparatus as set forth in claim 2 wherein said means for effecting pivotal movement of said sole link member includes a pair of spherical elements received in seats on diametrically opposite sides of an inner surface of said sole link member and in seats on one of the input and output members.

4. An apparatus as set forth in claim 1 wherein said means for mounting said sole link member for pivotal movement includes surface means defining an elongated slot in said sole link member, and a pin fixed to one of said input and output members and extending radially outwardly therefrom, said pin being received in said elongated slot.

5. An apparatus as set forth in claim 1 wherein said means responsive to pivotal movement of said sole link member includes means for generating an electrical output signal in response to pivotal movement of said sole link member.

6. An apparatus as set forth in claim 5 wherein said means for generating an electrical output signal in response to pivotal movement of said sole link member includes:
a transformer element mounted for movement along the central axis, connected to said sole link member and movable along the central axis in response to pivotal movement of said sole link member; and
means responsive to movement of said transformer element for generating said electrical output signal.

7. An apparatus as set forth in claim 6 wherein said means responsive to movement of said transformer element is a fixed portion of a linear voltage differential transformer having primary and secondary coil windings.

8. An apparatus as set forth in claim 6 wherein said electrical output signal has a characteristic which varies as a function of the direction of movement of said transformer element.

9. An apparatus as set forth in claim 6 wherein said output signal has a characteristic which varies as a function of the amount of movement of said transformer element.

10. An apparatus as set forth in claim 6 further including an elongated torsion bar for biasing said input and output members to a neutral position, said torsion bar connected at a first axial end portion to said input member for rotational movement therewith about the central axis, said torsion bar also connected at a second axial end portion to said output member for rotational movement therewith about the central axis.

11. An apparatus as set forth in claim 10 wherein said electrical output signal is proportional to the amount of torque applied to said torsion bar.

12. An apparatus for sensing the amount and direction of relative rotation between an input member and an output member which are disposed coaxially along a common central axis, said apparatus comprising:
a ring sole link member associated with the input and output members;
means for supporting said ring sole link member for pivotal movement relative to the input and output members about a first axis extending transverse to the central axis in response to relative rotation between the input and output members;
means for effecting pivotal movement of said ring sole link member about said first axis in response to relative rotation of the input and output members;
a transformer element mounted for movement along the central axis, connected to said ring sole link member and movable from an initial position along the central axis in proportion to relative rotation of the input and output members upon pivotal movement of said ring sole link member; and
means responsive to movement of said transformer element for generating an electrical output signal indicative of the amount and direction of movement of said transformer element from the initial position.

13. An apparatus as set forth in claim 12 wherein said means for effecting pivotal movement of said ring-shaped link includes a pair of spherical elements received in seats on diametrically opposite sides of an inner surface of said ring-shaped link and in seats on one of the input and output members.

14. An apparatus as set forth in claim 13 wherein said seats in one of the input and output members are in said input member 15. An apparatus as set forth in claim 12 wherein said means for mounting said ring-shaped link for pivotal movement includes surface means defining an elongated slot in said ring-shaped link, and a pin fixed to one of said input and output members and extending radially outwardly therefrom, said pin being received in said elongated slot.

16. An apparatus as set forth in claim 15, wherein said pin is fixed to the output member.

17. An apparatus as set forth in claim 12 wherein said transformer element is a core portion of a linear voltage differential transformer and which core portion is movable along the central axis.

18. An apparatus as set forth in claim 12 wherein said means responsive to movement of said transformer element is a fixed portion of a linear voltage differential transformer having primary and secondary coil windings.

19. An apparatus as set forth in claim 12 further including an elongated torsion bar for biasing said input and output members to a neutral position, said torsion bar connected at a first axial end portion to said input member for rotational movement therewith about the central axis, said torsion bar also being connected at a second axial end portion to said output member for rotational movement therewith about the central axis.

20. An apparatus as set forth in claim 12 wherein said output signal has a characteristic which varies as a function of the direction of movement of said transformer element from the initial position.

21. An apparatus as set forth in claim 12 wherein said output signal has a characteristic which varies as a function of the amount of movement of said transformer element from a first position.

22. An apparatus as set forth in claim 12 wherein said transformer element is disposed axially along the central axis adjacent said ring-shaped link, said ring-shaped link being engageable with an end portion of said transformer element.

23. An apparatus for sensing the amount and direction of relative rotation between a first member and a second member which are disposed coaxially along a common central axis, said apparatus comprising:
a link;
first means for coupling said link to said first member for pivotal movement about a first axis extending transverse to the central axis;

second means for coupling said link to said second member for pivotal movement about a second axis extending transverse to the central axis and spaced from said first axis, said link pivoting about said first and second axes upon relative rotation of said first and second members; and means responsive to pivotal movement of said link for generating an electrical output signal indicative of the amount and direction of pivotal movement of said link.

24. An apparatus as set forth in claim 23 wherein said link includes a ring portion which encircles the outer periphery of said second member and a portion extending axially from said ring portion.

25. An apparatus as set forth in claim 24 wherein said second means for coupling said link for pivotal movement includes a pair of spherical elements received in seats on diametrically opposite sides of an inner surface of said ring portion of said link and in seats on said second member.

26. An apparatus as set forth in claim 24 wherein said first means for coupling said link for pivotal movement includes surface means defining an elongated slot in said portion extending axially from said ring portion of said link, and a pin fixed to said first member and extending radially outwardly therefrom, said pin being received in said elongated slot.

27. An apparatus as set forth in claim 23 further including an elongated torsion bar for biasing said first and second members to a neutral position, said torsion bar connected at a first axial end portion to said first member for rotational movement therewith about the central axis, said torsion bar also being connected at a second axial end portion to said second member for rotational movement therewith about the central axis.

28. An apparatus as set forth in claim 27 wherein said electrical output signal is proportional to the amount of torque applied to said torsion bar.

* * * * *

UNITED STATES PATENT AND TRADEMARK OFFICE
CERTIFICATE OF CORRECTION

PATENT NO. : 4,800,764
DATED : January 31, 1989
INVENTOR(S) : Louis R. Brown

It is certified that error appears in the above-identified patent and that said Letters Patent is hereby corrected as shown below:

Column 7, line 59, change "ring sole link member" to
-- ring-shaped link --.

line 61, change "ring sole link member" to
-- ring-shaped link --.

line 67, change "ring sole link member" to
-- ring-shaped link --.

Column 8, line 2 and 3, change "ring sole link member" to
-- ring-shaped link --.

line 6, change "ring sole link member" to
-- ring-shaped link --.

Signed and Sealed this

Eleventh Day of July, 1989

Attest:

DONALD J. QUIGG

Attesting Officer

Commissioner of Patents and Trademarks